No. 714,613. Patented Nov. 25, 1902.
A. W. SCHRAMM, E. B. WILFORD & B. FULTON.
HANDPIECE FOR DENTAL ENGINES.
(Application filed July 26, 1902.)
(No Model.)
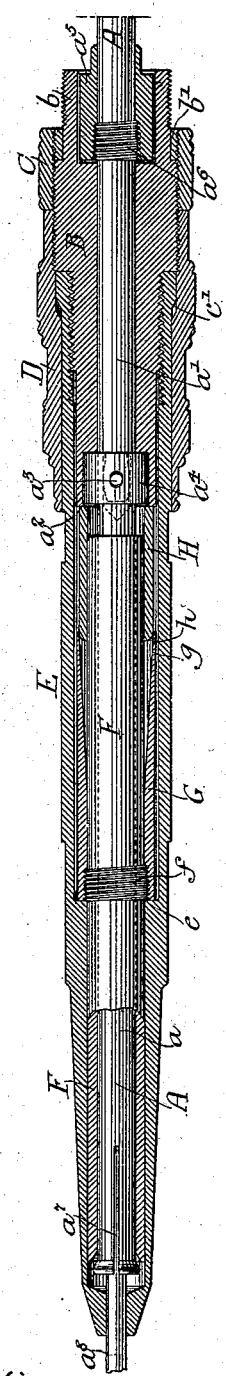
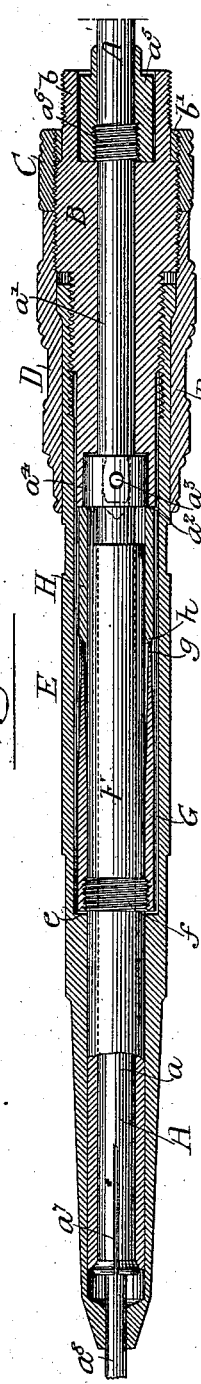
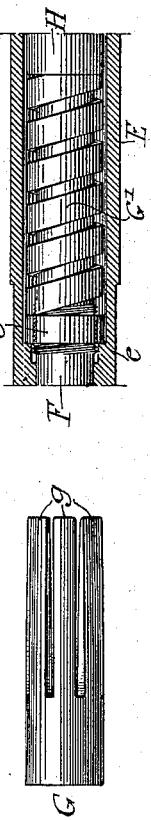
Witnesses:-
Herman E. Mehus.
A. B. Coppes
Inventors
Adolf W. Schramm,
Edward B. Wilford,
Benjamin Fulton,
by their Attorneys:

UNITED STATES PATENT OFFICE.

ADOLPH W. SCHRAMM, EDWARD B. WILFORD, AND BENJAMIN FULTON, OF PHILADELPHIA, PENNSYLVANIA, ASSIGNORS TO ELECTRO DENTAL MANUFACTURING COMPANY, OF PHILADELPHIA, PENNSYLVANIA, A CORPORATION OF PENNSYLVANIA.

HANDPIECE FOR DENTAL ENGINES.

SPECIFICATION forming part of Letters Patent No. 714,613, dated November 25, 1902.

Application filed July 26, 1902. Serial No. 117,123. (No model.)

*To all whom it may concern:*

Be it known that we, ADOLPH W. SCHRAMM, EDWARD B. WILFORD, and BENJAMIN FULTON, citizens of the United States, residing at Philadelphia, Pennsylvania, have invented certain Improvements in Handpieces for Dental Engines, of which the following is a specification.

Our invention relates to dentists' implements; and it consists particularly of an improved tool or bit holder.

One object of the invention is to provide a device of the type noted which shall be simple to construct and durable and reliable in operation.

Further objects of the invention are to provide a tool of convenient shape having ample bearings, so as to assure the best wearing qualities, and which shall be so designed as to prevent the escape of oil, and so that it can be taken apart without the necessity for special tools and can be cleaned and oiled without disturbing the adjustment of any of its parts.

These objects we attain as hereinafter set forth, reference being had to the accompanying drawings, in which—

Figure 1 is a sectional elevation of our improved tool-holder, showing the various parts in the positions which they occupy when the chuck is closed and gripping the tool. Fig. 2 is a sectional elevation similar to Fig. 1, showing the various parts in the positions which they occupy when the chuck has been brought to its open position, so as to release the tool. Fig. 3 is a side elevation of the spring for retaining the chuck in its closed position, and Fig. 4 is a sectional elevation of a modified form of a portion of the tool.

In the above drawings, A represents the tool-spindle of the handpiece, this being composed of two portions $a\ a'$, joined together by means of a flexible coupling $a^2$, the said coupling including a pin $a^3$, which projects laterally beyond the portion $a'$ of the tool-spindle and engages or passes into a cylindrical collar $a^4$ on the portion $a$. The portion $a'$ of the tool-spindle A is carried in a journal or bearing piece B, which is recessed at both ends, as shown, the recess in the forward end of the same being of a size to accommodate the cylindrical collar $a^4$ and the recess in the rear end being for the reception of a collar $a^5$, screwed upon the rear portion $a'$ of the tool-spindle, as indicated at $a^6$. The forward end of the said spindle is constructed to form a chuck $a^7$ for the reception of dental tools of the well-known type, the rear portion of one of these being shown as extending within the chuck at $a^8$.

The bearing-piece B is preferably constructed as shown, and externally it may be described as consisting of three sections, each provided with threads and placed so that the section of largest diameter is between the other two sections. A portion of the surface of the rear section of said bearing or journal piece B is provided with threads $b$ for the purpose of attaching the handpiece to the operating mechanism of a dental engine in the well-known manner, and there is a collar $b'$ of internal diameter such that it may be slipped over these threads and fit upon an unthreaded surface adjacent thereto, this collar being threaded upon its external surface and of such thickness that when abutting against the middle section of the bearing-piece B it forms a continuation of the similarly-threaded surface of said section. Upon the rear portion of this threaded middle section and extending over upon the collar $b'$ is a shell C, forming part of the exterior casing of the handpiece, and the said collar $b'$ is employed to retain the shell C in a definite and adjustable position upon the bearing-piece B. Said piece C is first placed where desired upon the threaded surface of the middle section, and then the collar $b'$ is set up, so as to hold it permanently in place against possible forward movement.

In front of the shell C upon the forward portion of the bearing-piece B is screwed a second shell D, which forms another portion of the external casing of the handpiece and is limited as to the extent of its rearward motion by said adjustable shell C. On the forward portion or front section of the bearing-piece B, which, as above noted, is preferably of smaller diameter than the middle portion, is movably threaded a piece E, which serves not only as an exterior casing, but also as a bearing for an elongated sleeve F, fitting over the tool-spindle and extending inwardly almost to the cylindrical collar $a^4$.

We preferably employ left-handed threads between the casing-piece E and bearing-piece B, so that as the tool-spindle revolves there will be no tendency for the latter of these pieces to become loosened. The sleeve F is rotatable within the casing-piece E, turning freely with the tool-spindle when the tool or bur is operatively engaged by the chuck. The forward end of the said sleeve is provided with a tapered portion constructed to engage the outer tapered part of the chuck $a^7$ of the tool-spindle, and it has, preferably at about its middle part, a threaded portion $f$, upon which is screwed the pronged spring-piece G, of the form shown in Fig. 3, whose flexible portions extend rearwardly into engagement with the beveled edge $h$ of a collar H, whose opposite end is designed to come into engagement with the collar $a^4$ when the chuck is closed and to abut against the face of the bearing-piece B when said chuck is open, as shown in Figs. 1 and 2 of the drawings.

While we preferably employ a pronged spring G of the form shown, it will be understood that, if considered advisable, this may be replaced by a spring of the spiral form, as illustrated in Fig. 4. When such construction is used, an adjustable collar $e^2$ is secured on the sleeve F, and the spring G' is placed between said collar and the collar H, which in such case is made without the beveled end $h$.

The front end of the spring-piece G abuts against the front edge portion $e$ of the casing-piece E when the chuck is open, and it will be noted that the said piece E has at its inner end a beveled or tapered portion $e'$, designed to contact with and jam against a similarly-beveled portion of the shell D, thereby locking in position the various parts of the device when the tool is in operation.

In order to release the tool $a^8$ when the chuck is closed upon the same, the handpiece, with its parts in the position indicated in Fig. 1, is grasped in the hands of the operator and the casing-piece E held firmly, while the bearing-piece B, through the medium of the shell D, is screwed into said casing-piece, such operation causing the bearing-piece B to engage the collar H and force its bevel edge beneath the prongs of the spring G. This carries forward the tool-spindle as a whole relatively to the sleeve F, which is prevented from moving forward itself by the forward edge of the spring G, striking the shoulder or offset portion $e$ of the casing-piece E. The tool having been removed and replaced by another, the screwing outwardly of the bearing-piece B relatively to the casing-piece E permits the prongs of the spring G to thrust the collar H against the collar $a^4$, and thereby pulls the tool-spindle within the sleeve F and causes its chuck $a^7$ to grip the tool or bur $a^8$.

Owing to the practical impossibility of making an absolutely true bore through the several parts of a handpiece of the length contemplated by our invention, we have considered it advisable and advantageous to make the tool-spindle A in two portions connected by a flexible coupling, as shown, and have thereby secured a more perfect fit of the said tool-spindle within its bearing and casing pieces, at the same time having no undue looseness of the various parts, with consequent faulty and unsatisfactory action.

We claim as our invention—

1. A handpiece for a dental engine having a tool-spindle with a chuck, a sleeve around the same for operating the chuck, a cylindrical spring having flexible prongs acting upon the sleeve to normally maintain the chuck in the closed position with means for causing said sleeve to release the chuck, substantially as described.

2. A handpiece for a dental engine having a tool-spindle provided with a chuck and a projecting collar, a sleeve surrounding the chuck portion of the said spindle and acting upon the chuck, and a cylindrical piece having flexible prongs, operatively connected with the projecting collar of the spindle, whereby said chuck may be retained in the closed position, with means for releasing the chuck, substantially as described.

3. A handpiece for a dental engine having a jointed tool-spindle provided with a chuck and a projecting collar, a sleeve surrounding the chuck portion of said spindle and acting upon the chuck, a collar also surrounding the spindle, a spring rigidly fixed at one end to said sleeve and operative through said collar upon the projecting collar of the spindle, whereby said chuck may be retained in the closed position, together with means for moving the spindle relatively to the sleeve and thereby releasing the chuck, substantially as described.

4. The combination of a tool-spindle having a chuck and a projecting collar, a sleeve operative upon said chuck, a pronged spring mounted upon the sleeve, a collar in engagement with the projecting collar of the tool-spindle and having a beveled surface placed to coact with the pronged spring, with means for moving the tool-spindle relatively to the said sleeve against the action of said spring and thereby releasing the chuck, substantially as described.

5. The combination of a tool-spindle having a chuck and a projecting collar, a sleeve operative upon said chuck, a spring operating upon said sleeve, a collar in engagement with the projecting collar of the tool-spindle, the same being constructed to coact with the spring, a casing-piece in engagement with a portion of said sleeve, and a bearing-piece fixed relatively to the tool-spindle, the said bearing and casing pieces being movable relatively to each other to release or close the chuck, substantially as described.

6. The combination of a tool-spindle having a projecting collar and a chuck, a bearing-piece surrounding a portion of the spindle, a sleeve on the spindle engaging the chuck thereof, a casing-piece on the sleeve having means for limiting its motion relatively to the bearing-piece, a spring for forcing apart the projecting collar of the tool-spindle and the said sleeve, the spring being substantially cylindrical in form and threaded on the sleeve, thereby normally maintaining said sleeve in a position to hold the tool in the chuck, substantially as described.

7. The combination of a tool-spindle provided with a chuck and having a projecting collar at the point of junction of its parts, a bearing-piece to fix the tool-spindle against longitudinal movement relatively thereto, and a sleeve fixed on the spindle in engagement with the chuck thereof, a casing fixed on the sleeve having means for limiting its motion relatively to said bearing-piece, a spring surrounding the sleeve on the spindle, and a collar adapted to be engaged by said spring and abutting against the projecting collar of the tool-spindle, substantially as described.

8. The combination of a tool-spindle provided with a chuck and having a projecting collar at the point of junction of its parts, a bearing-piece to fix the tool-spindle against longitudinal movement relatively thereto, and a sleeve fixed on the the spindle in engagement with the chuck thereof, a casing fixed on the sleeve having means for limiting its motion relatively to said bearing-piece, a pronged spring surrounding the sleeve on the spindle and a collar adapted to be engaged by the prongs of said spring, said collar being provided with a beveled edge and abutting against the projecting collar of the tool-spindle, with means for causing the prongs of the spring to ride upon the beveled portion of the collar, substantially as described.

9. The combination of a tool-spindle having a chuck, a bearing-piece surrounding a portion of the spindle fixed to prevent its longitudinal motion relatively thereto, a sleeve constructed to permit said chuck to open or become closed, a shell fixed to said bearing-piece, and a casing-piece extending over said sleeve and entering said shell, said casing-piece being movable upon the bearing-piece and having means whereby its longitudinal motion is limited in one direction by said bearing-piece and in the other direction by the shell, substantially as described.

10. The combination of a tool-spindle having a chuck, a bearing-piece surrounding a portion of said spindle, a sleeve constructed to permit said chuck to open or become closed, a shell fixed to said bearing-piece and a casing-piece extending over said sleeve and entering said shell, a second shell adjustably fixed to said bearing-piece and placed to limit the motion of said first shell, said casing-piece being movable upon the bearing-piece, substantially as described.

In testimony whereof we have signed our names to this specification in the presence of two subscribing witnesses.

ADOLPH W. SCHRAMM.
    EDWARD B. WILFORD.
    BENJAMIN FULTON.

Witnesses:
 WILLIAM E. BRADLEY,
 JOS. H. KLEIN.